United States Patent [19]

Geckeler et al.

[11] Patent Number: 4,548,494

[45] Date of Patent: Oct. 22, 1985

[54] METHOD FOR ADJUSTING TWO ENDS OF TWO OPTICAL FIBERS TO BE CONNECTED TO ONE ANOTHER

[75] Inventors: Siegfried Geckeler; Dieter Schicketanz, both of Munich, Fed. Rep. of Germany

[73] Assignee: Siemens Aktiengesellschaft, Berlin & Munich, Fed. Rep. of Germany

[21] Appl. No.: 338,980

[22] Filed: Jan. 12, 1982

Related U.S. Application Data

[63] Continuation of Ser. No. 88,171, Oct. 25, 1979, abandoned.

[30] Foreign Application Priority Data

Nov. 21, 1978 [DE] Fed. Rep. of Germany ....... 2850430

[51] Int. Cl.$^4$ .......................................... G01N 21/00
[52] U.S. Cl. ................................................ 356/73.1
[58] Field of Search ...................... 356/73.1, 153, 400

[56] References Cited

U.S. PATENT DOCUMENTS

3,938,895  2/1976  Bridger et al. ..................... 356/153
4,021,121  5/1977  Schicketanz ....................... 356/237

FOREIGN PATENT DOCUMENTS

2717412  10/1978  Fed. Rep. of Germany ..... 356/73.1

OTHER PUBLICATIONS

Dannwolf et al., "Optical-Fiber Impulses Response Measurement System", *IEEE Transaction on Instrumentation and Measurements*, vol. IM-25, No. 4, Dec. 1976, pp. 401-406.

Hillerich, "Dampfungsmessung an Lichtleitfasern durcd Pulsreflexion", *Technisches Messen atm*, 1976, vol. 9, pp. 269-270.

M. K. Barnoski et al., "Optical Time Domain Reflectometer" *Applied Optics,* vol. 16, No. 9, Sep. 1977, pp. 2375-2379.

Barnoski et al., "Measurements in Fiber Optics", *Proceeding of the IEEE,* vol. 66, No. 4, 1978, pp. 429-441.

Rode et al., "Lichtleitfasern—Ein Ruckstreuverfahren Zur Untersuchung von Lichtleitfasern", *NTZ,* vol. 31, No. 2, 1978, pp. 144-146.

Kohanzadeh, Y., "Hot Splices of Optical Waveguide Fibers", App. Optics, 3-1976, pp. 793-795.

Hillerich, B., "On Site Location of Optical Fiber Defects & Evaluation of Transmission Loss", Proc. of the 26th Intern. Wire & Cable Sympos., Cherry Hill, N.J. USA, Nov. 15-17, 1977, pp. 373-379.

*Primary Examiner*—William H. Punter

[57] ABSTRACT

A method for adjusting the position of two ends of a pair of aligned optical fibers during formation of a connection or a splice between the two ends either to repair a break in a fiber or to add another fiber characterized by coupling a light pulse into a free end of one of the pair of fibers, measuring the intensity of a back-scattering of the light pulse received at the free end, determining an abrupt change in the intensity of the back-scattered light at the free end corresponding to the point of the connection to be made for the pair of fibers, and adjusting the position of the two ends of the pair of fibers to decrease the amount of the abrupt change in the intensity being determined to the smallest determined value. When the smallest amount of the abrupt change is obtained, the ends of the pair of fibers are in their best axial alignment for forming a connection with the lowest possible attenuation and the process for connecting or splicing the fibers together can be initiated or continued to completion.

1 Claim, 3 Drawing Figures

METHOD FOR ADJUSTING TWO ENDS OF TWO OPTICAL FIBERS TO BE CONNECTED TO ONE ANOTHER

This is a continuation of application Ser. No. 88,171, filed Oct. 25, 1979, now abandoned.

BACKGROUND OF THE INVENTION

The present invention is directed to a method for adjusting the ends of two aligned optical fibers to be connected to obtain the best optical alignment for the connection.

In optical communication transmissions, which use optical fibers, a necessity often occurs for connecting two fiber ends with one another in such a manner that the transmitted light signal can pass from one fiber end into the other fiber and preferably without attenuation or at least with a minimum amount of attenuation. This is only possible, when the two ends are adjusted in such a manner that their end faces abut one another and the fibers lie on a common axis. When in the adjusted position, the fibers may be interconnected or spliced together by means of welding such as by utilizing an arc or by means of bonding to obtain a practically attenuation free connection. The forming of the above mentioned connection makes it possible to prepare a fiber which has been broken in two or to add an additional fiber to the end of another fiber.

Micro manipulators or other adjusting devices can be utilized for the adjustment of the optical fibers and provided means for monitoring the precise position of the optical fibers by observing the connection location with a microscope. By so doing, however, the freedom of mobility of the working personnel is greatly reduced and to construct such an adjustment device at the location of a rupture in the open or in the field is expensive. Above all, the quality of the connection and its amount of freedom from attenuation can only be determined subsequent to the formation of the connection.

SUMMARY OF THE INVENTION

The object of the present invention is to provide a method in which the optimum position of the ends of a pair of optical fibers to one another can be readily determined before the fiber ends which are to be connected are welded or bonded together and to enable the ends of the fibers to be adjusted during the securing process while their positions are still shapeable. The method enables an economic optimization of a connection or splice. The method utilizes an extensive stationary apparatus located in a central exchange or switching station from which the fiber cables extends and allows adjustments to be made at a point where the splice or connection is to be made and which point is removed from the central exchange or switching station and therefore allows a great freedom of mobility of the personnel forming the splice or connection. The method can be used to either repair a break in a fiber or to splice an additional fiber into an end of a fiber.

This method is accomplished by coupling a light pulse or a series of light pulses into a free end of one of the pair of fibers, for example, in a central exchange or a switching location or station. The method further includes measuring the intensity of the back-scattering of the light pulse which is received at the free end, determining an abrupt change in the intensity of the back-scattered light at the free end, corresponding to the point of the connection or the splice to be made between the pair of fibers which change is due to the attenuation occuring at the splice, and then adjusting the positions of the two ends of the pair of fibers located at the point of the splice or the connection to decrease the amount of the abrupt change in the intensity being determined to the smallest amount for example almost practically zero. After obtaining the minimum change in the intensity, the fibers are aligned for either forming the connection or completing the connection of the aligned fibers.

In accordance with the method, a light pulse is coupled in at the origin of one of the optical fibers, for example the central exchange or at a switching location. On passing through the fiber, a part of the light pulse is constantly back-scattered. The intensity of the back-scattered light is received at the same point of origin of the fiber and the attenuation of the fiber and the attenuation in each individual segment area of the fiber can be concluded from a temporal course of an intensity curve. A connection segment or splice represents an attenuation which is represented as a large jump or change in the intensity curve with the greater splice attenuation causing a greater jump or change in the intensity. If the ends are displaced with respect to one another at the connection location by the assembly personnel, then the magnitude in the intensity change or jump will be changed or modified. If by the moving of the ends places then in a position in which the axial alignment for the fibers is an optimum position for both the fibers, then this position can be recognized by the fact that the intensity change is at a minimum and in some more favorable cases zero. When this alignment between the pair of fiber ends is obtained, a signal can be sent to the assembly person to notify them of this ideal alignment so that they can subsequently join the fibers by either bonding or welding the ends of the fibers together in the aligned position.

The signal to the assembly person can be obtained by converting the amount of deviation occuring in the intensity change into either an acoustical signal, an electrical signal or a light signal which signals are transmitted to the area of the point for connection. In addition, the coupling of the light into the fibers may be coupling a sequence of light pulses into the free end and the amount of change or deviation in the intensity changes are obtained by averaging the determined value for the intensity changes for each pulse.

BRIEF DESCRIPTIONS OF THE DRAWINGS

DESCRIPTION OF THE PREFERRED EMBODIMENTS

The principles of the present invention are particularly useful for obtaining the alignment between a pair of optical fibers, which are to be connected or spliced together with a connection or splice, which has a minimum amount of attenuation. The method of adjusting the position of the two ends may be used either for adjusting the two ends as an additional fiber is added on to the end of an existing fiber or to adjust the two ends created by a break or rupture of an existing fiber during a repair splice of the fiber. It should also be noted that the method of adjusting can be continued to be utilized during the formation of the splice or connection as long as the movement of the fiber ends is still obtainable or until the bonding or joining has completely prevented further changes in the position of the ends.

Figure 1:
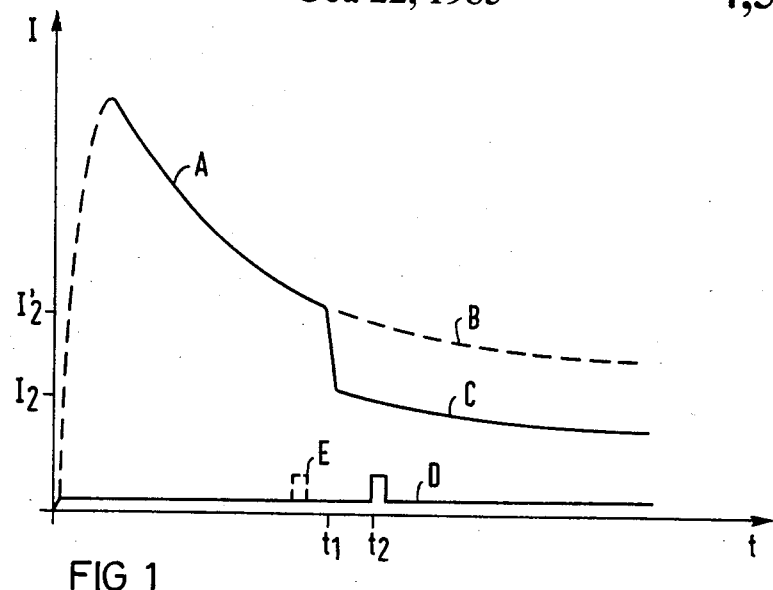
FIG. 1 is a graph illustrating the temporal course of the back-scattered light intensity which is determined at a free end of a fiber in accordance with the present invention.

If a light pulse is beamed or coupled into an end of an optical fiber 1 (FIG. 2), the light pulse will travel through this fiber with the light velocity c determined by the fiber material. This light pulse reaches a differential length element of the optical fiber after a transit path x in a transmit time $t'=x/c$. Along this transit path, the intensity of the light pulse decreases exponentially due to extinction. This extinction is partially effected by means of absorption and by means of scattering of the light into the fiber casing. A small fraction of the light, however, is also back-scattered in the direction towards the point of origin at the one end. After a further transit time $t'=x/c$, this back-scattered light reaches the end of the fiber which is the point of origin for the pulse. Since both the light pulse as well as the back-scattered light are attenuated along the transit path x, an exponential, temporal course of an intensity curve of the back-scattered light can be derived. In FIG. 1, a curve A represents such an intensity curve in which the light pulse is coupled into the fiber at $t=0$ and the intensity of the light back-scattered at location x is measured at time $t=2x/c$. The curve A is for a fiber which exhibits no irregularity, such as a splice, up to the location $x_1$ and along a transit time $t_1=2x_1/c$.

A location $x_1$, however, a poorly adjusted connection or splice exists. Upon passing through this splice location, both the initial light pulse as well as back-scattered light suffer an attenuation. At time $t_1$, therefore, the intensity curve of the back-scattered light changes abruptly and as illustrated decreases. At all fiber segments of a distance $x > x_1$ the intensity curve C of the back-scattered light is attenuated with respect to the intensity curve for an undisrupted fiber which curves pass the distance greater than $x_1$ is illustrated by a broken line curve B.

Given a change or an adjustment of the position of the two fiber ends to be connected to one another, the curve C will be displaced. An increase of the intensity values will occur with an improvement of the adjustment positions of the ends and a reduction of the intensity values occurs with a deterioration of the adjustment. Given an optimum adjustment position, the curve C will achieve its highest values.

In a simple variation of the method, the intensity curve can be determined and the position of the ends which are to be connected, can be changed until the intensity curve exhibits practically no intensity jump and indicates an optimum adjustment position. To that end, the back-scattered light can be received with an opto-electronic receiver. The output signal of the receiver, which is proportional to the intensity, can be observed on an oscillograph. It is not necessary for the adjustment of the position to observe the intensity jump itself. On the contrary, it is sufficient to observe the intensity for the back-scattered light at locations beyond the splice, for example the curve C or selected values of this curve C. The intensity value $I_2$, which is received after the transit time $t_2=2x/c>t_1$ can be observed and the fiber ends are adjusted so that a maximum value for $I_2$, which is a minimum deviation from a maximum value $I_2'$ which is obtained as the limiting value given for an optimum adjustment or for a fiber without any splices as shown by curve B which has no intensity jumps.

Particularly in those cases in which the intensity jump is not perceptible, it can be advantageous to employ succeeding parts of the intensity curve in this manner for use during an adjustment procedure. Thus, if a given splice lies very close to the fiber beginning or free end, the reflections occuring at the free end of the fiber are superimposed on the intensity jump. Upon change of the adjustment position for the fiber ends, a neutral position of the ends to be connected can be achieved in which neutral position the succeeding curve C is maximally displaced to its greater intensity values and with movement from the neutral position, the curve C again starts to assume smaller values. This neutral position which has the highest values for curve C then represents the optimum adjustment position for the fiber ends which position has in intensity jump of practically zero.

Figure 2:
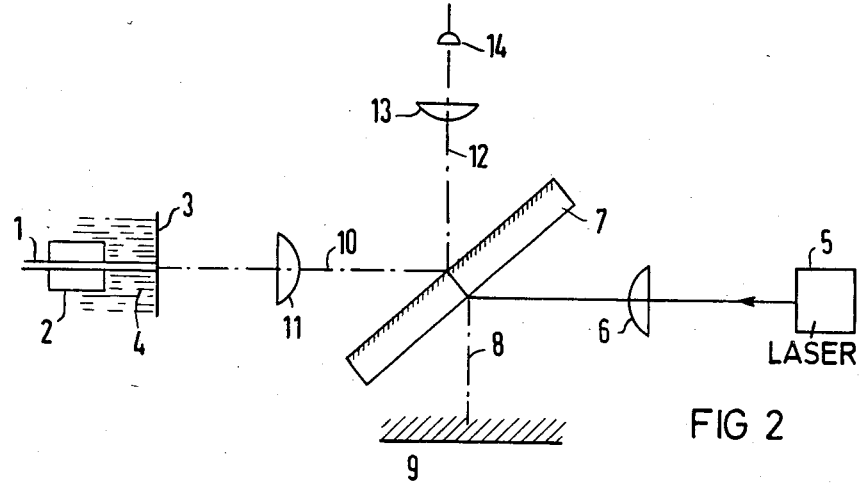
FIG. 2 is a schematic illustration of a reflection measuring location for the coupling light pulses into and receiving the back-scattered light in accordance with the method of the present invention.

A light reflection measuring device which can be advantageously used to perform the method has been already described in the U.S. Pat. No. 4,021,121, which includes the disclosure of the German OS No. 24 51 654 and is illustrated in FIG. 2. The free end of the optical fiber 1 which is to be connected at its other end with the end of a second optical fiber is affixed in a plug 2. A coated quartz plate 3 is positioned adjacent the end surface of the fiber 1 so that the plug and fiber can be immersed into an immersion fluid 4 in order to avoid reflections. A pulse laser 5 produces a beam of laser pulses which beam is expanded by means of a first lens 6, and is directed toward a beam divider 7 which may be a 50% reflecting mirror 7 that is located at an angle to the laser beam to create two partial beams 8 and 10. The partial beam 8 of the laser pulses is reflected by the mirror 7 and is absorbed at an absorption surface 9. The remaining or other partial beam 10 of the laser pulses is focused onto the free end of the fiber by a second lens 11.

The laser pulse, which is coupled into the fiber 1, travels along the fiber through the connection location and into the second fiber with a part of the light of each pulse being back-scattered to the end surface of the free end of fiber 1. This back-scatter light again arrives at the beam divider 7 and is reflected along a beam path 12, through a focusing optics 13 onto a light-sensitive receiver 14, for example a photodiode.

Figure 3:
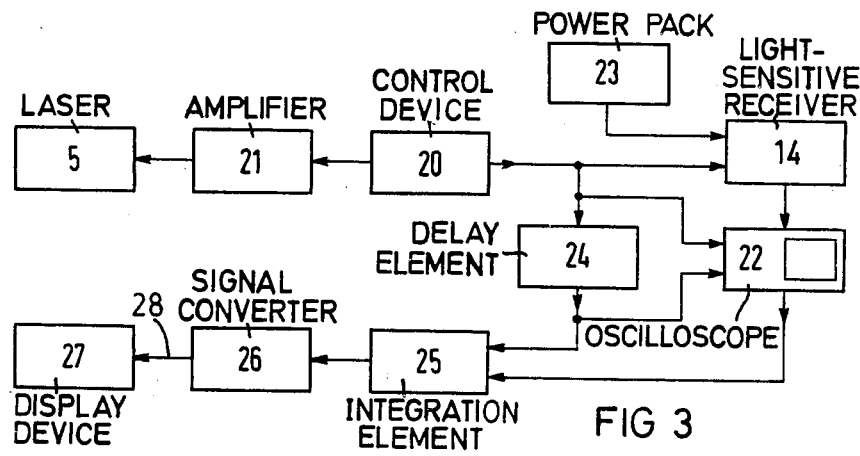
FIG. 3 is a block diagram of an electronic device for performing the method of the present invention.

A control device 20 (FIG. 3) is employed for exciting the pulse laser 5 (FIG. 2) which may be, for example, a GeAs laser. The control device 20 can consist of one or, if necessary, a plurality of pulse generators whose pulses are amplified in an amplifier 21, which has a thryistor pulsator, to the required pump power for the laser 5. The pulses of the control device 20 are also employed for triggering an oscilloscope 22. The output signal of the opto-electronic receiver 14, for example an avalanche photodiode, is delivered to the signal input of the oscilloscope 22. This photodiode is supplied by a power pack 23, and the trigger signal of the control device 20 serves the purpose of switching on the voltage supply of the avalanche photodiode simultaneously with the coupling of the light pulse into the end of the fiber. Thus, the supply voltage of the diode increases exponentially and achieves its final value after only approximately a microsecond, so that the amplification is very small directly after the coupling-in of the light pulse and only rises subsequent thereto. By providing this short time delay, the diode is initially insensitive and cannot be overdriven due to reflections which arise upon coupling the light pulse into the end surface of the free end of the fiber.

Preferably, the entire course of the intensity curve is not observed, but rather only a small section, which arises due to the back-scattering at a fiber section situated beyond the connection or splice location. To this end, the trigger pulse of the oscilloscope 22 can be conducted into a delay element or "scan delay" 24. If one employs a double beam oscilloscope, then the delayed pulse of the delay element 24 can be supplied to the second input of the oscilloscope and be observed as a curve D of FIG. 1. The output signal of the opto-electronic receiver 14, which was amplified in the oscilloscope 22 and this delayed scanning pulse can be input into an integration element 25 which integrates and stores the receiver signal arriving during the duration of the scanning pulse and emits a corresponding continuous signal. Such a "sample and hold" circuit can consist, for example, of an analogue store whose input is opened by the scanning pulse for the inscription of the corresponding intensity value and which emits a continuous signal until the reading-in of the new value. This continuous signal, for example a DC voltage, is now supplied to a signal converter 26, for example a voltage/frequency converted TDB 0555 sold by Siemens AG, and the continuous signal is converted into a signal, for example, an acoustic frequency. This signal can subsequently be displayed in a display device 27 in order to indicate the quality of the adjustment to the work personnel at the connection or splice location.

If, for example, an acoustic frequency is generated as a signal and the acoustic signal has a tone pitch which becomes higher as the received intensity of the back-scattered light at the time of the scanning pulse increases, then a higher pitch indicates a better adjustment position for the ends. Given a further improvement of the adjustment, the tone pitch asymptotically approaches an upper value which corrresponds to an intensity jump of zero. A lowering of the tone pitch always indicates a greater intensity jump, and a deterioration in the adjustment positions. A head set can be employed as the display device to which the acoustic frequency is transmitted, for example, by a radio.

It is particularly advantageous that the assembly personnel only requires a head set for receiving the signal at the open cable segment, and the other devices or equipment at the fiber beginning, for example at the switching location or station of the cable network, can be installed so as to be stationary. With the use of the head set as the receiver, the assembly personnel has his hands free for adjusting the positions of the fiber ends. Since a person's hearing responds very sensitively to fluctuations of a tone pitch, an optimum adjustment position for a low splice attenuation can be achieved with this method. For personnel who are less sensitive to tone pitch, the tone pitch can also be converted by a frequency meter into a needle deviation.

A telephone connection of an existing telephone network can also be employed for transmitting the acoustic frequency, and if two electrically conducting leads are present in the optical communication segment, then a telephone segment is present as a transmission line 28. Since optical communication cables almost always contain a steel cable or lead for support, a telephone connection can also be completed via this steel lead with the ground for the cable being used as the return conductor.

Another alternative is to employ the optical fiber itself for transmitting the signal or another fiber in the bundle containing the fiber as a transmission line 28. To this end, the continous signal is converted by the signal converter into an optical signal which can be transmitted via a transmission line 28 which is either another or the optical fiber and can be received at the end of the fiber which is to be spliced. If the protective casing of the optical fiber is sufficiently transparent, it is possible to receive the signal by capturing the scatter light emerging in the proximity of the splice location by means of a lateral positioned photodiode. Accordingly, the service personnel need only adjust the position of the ends to be connected to a minimum light signal.

One can also determine the intensity jump or change in a different manner. Thus, for example, a small portion of the intensity curve can be scanned or sampled by means of a scanning pulse E (FIG. 1). Two portions are sampled with one portion being in an undisturbed segment of the fiber before the splice connection location and the other being after the splice location. The difference of the two sampled intensity values then contains the "normal" attenuation of the undisrupted fiber which is superimposed with the intensity jump. With a greater intensity jump this difference is all the greater and the difference can be measured and converted into a signal, for example an acoustic frequency. If the intensity jump at the splice is practically zero when an optimum adjustment position is obtained, the signal assumes its smallest possible value. In this case, therefore, one must adjust the position of the fiber ends to obtain for example, the minimum tone pitch. Of course, instead of an acoustic or optical signal, an electric signal can also be generated. A needle deflection can also be employed for displaying the signal.

If a fiber rupture or break occurs, the observation of the intensity curve on the oscilloscope offers the possibility of determining the location of the fiber rupture from the transmit time of the intensity jump. In general, however, one can do without the employment of an oscilloscope and the output signal of the receiver 14 and the delayed scanning signal are directly supplied to the "sample and hold" circuit 25. In particular, a pulse sequence can be coupled into the fiber end instead of a single light pulse, and the "sample and hold" circuit then will receive and integrates a plurality of signals in the analogue store to produce a signal which is integrated over a plurality of intensity jumps. Thereby, the signal-to-noise ratio can be improved. Thus, for example, a box car integrater can be employed instead of the scan delay 24. In this case, the intensity curve cannot be immediately seen on the screen of an oscilloscope, but is slowly recorded with an X-Y recorder.

In addition, the method can also offer the opportunity of directly measuring the attenuation of the splice. To this end, the voltage drop is determined by means of two scanning pulses in the above described manner and the zero point of the curve according to FIG. 1 is measured with a third scanning pulse. The value of the splice attenuation can be then calculated in a small computer.

Although various minor modifications may be suggested by those versed in the art, it should be understood that we wish to embody, within the scope of the patent granted hereon, all such modification as reasonably and properly come within the scope of our contribution to the art.

We claim:

1. A method for adjusting the positions of two ends of a pair of aligned optical fibers with at least one fiber of the pair being an installed fiber of an optical communication system and simultaneously forming a permanent connection between the pair of adjusted ends of said fibers, said method comprising the steps of coupling a light pulse into a free end of said one fiber of said pair of fibers; measuring the intensity of a back-scattering of the light pulse received at said free end of said one fiber; determining an abrupt change in the intensity of the back-scattered light at said free end of said one fiber corresponding to the point of connection to be made for said pair of fibers; generating a signal corresponding to the intensity change being determined; then adjusting the position of the two ends of the pair of fibers until the signal being received matches the signal with the smallest amount of deviation from a given value and then completing the forming of the permanent connection between the two ends so that the amount of the abrupt change in the intensity being determined is decreased to the smallest determined amount to indicate the alignment of the two ends which are being connected together, said adjusting including converting the amount of deviation into an acoustical frequency, said acoustical frequency being transmitted to be received adjacent a location of the two ends being adjusted so that the worker can sense when alignment is obtained.

* * * * *